US006496863B1

(12) United States Patent
Palmer

(10) Patent No.: US 6,496,863 B1
(45) Date of Patent: Dec. 17, 2002

(54) METHOD AND SYSTEM FOR COMMUNICATION IN A HETEROGENEOUS NETWORK

(75) Inventor: Robert L. Palmer, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,196

(22) Filed: Sep. 30, 1999

(51) Int. Cl.$^7$ .............................................. G06F 13/42
(52) U.S. Cl. ...................................... 709/224; 709/230
(58) Field of Search ................................. 709/224, 230, 709/236, 237, 300

(56) References Cited

U.S. PATENT DOCUMENTS

| | | | |
|---|---|---|---|
| 4,644,532 A | 2/1987 | George et al. ............... | 370/255 |
| 5,276,861 A | 1/1994 | Howarth ........................ | 714/4 |
| 5,598,566 A | 1/1997 | Pascucci et al. ............ | 713/324 |
| 5,758,342 A | 5/1998 | Gregerson .................... | 707/10 |
| 5,805,786 A | 9/1998 | Badovinatz et al. ........... | 714/4 |
| 5,870,565 A | * 2/1999 | Glitho | |
| 6,138,154 A | * 10/2000 | Karion ........................ | 709/223 |

* cited by examiner

Primary Examiner—David Y. Eng
(74) Attorney, Agent, or Firm—Floyd Gonzalez; Cantor Colburn LLP

(57) ABSTRACT

An exemplary embodiment of the present invention is a system having a diverse hardware platform monitored and managed from a central control node in a distributed, parallel, heterogeneous computing environment. The central control node executes both a hardware monitor program and an intermediary program to monitor and manage diverse hardware in a distributed, parallel, heterogeneous computing environment. The intermediary program emulates network frame hardware by facilitating communication between the hardware monitor program and diverse node hardware. Another exemplazy embodiment of the present invention is a method for facilitating communication between a hardware monitor for monitoring and management of node hardware and for providing an interface for administrator interaction with the node hardware and diverse node hardware in a distributed, parallel, heterogeneous computing environment. The intermediary program receives requests from the hardware monitor for the diversenode hardware and sends responses to the hardware monitor from the diverse node hardware. The intermediary program decodes and encodes these responses and requests, respectively, using hardware monitor protocol and diverse node hardware protocol.

29 Claims, 3 Drawing Sheets

METHOD AND SYSTEM FOR COMMUNICATION IN A HETEROGENEOUS NETWORK

BACKGROUND OF THE INVENTION

The invention relates to a method and system for monitoring and managing a diverse hardware platform from a central control node in a distributed, parallel, heterogeneous computing environment. More particularly, the invention relates to an intermediary program for use with a hardware monitor program in a distributed, parallel, heterogeneous computing environment, such as the IBM RISC System/6000 Scalable POWERparallel Systems (SP), that emulates network frame hardware by making any diverse node hardware appear like any other node hardware that is part of a network frame in a heterogeneous computing environment.

A parallel, distributed computing system, such as the IBM RS/6000 SP, is a computer network consisting of linked mini-computers or personal computers directed to the sharing of information created and maintained at each of the mini-computers or workstations within the network. In the IBM RS/6000 SP, a central control node (the "Control Workstation" or "CWS") serves as the monitor and control node for the entire system. The CWS is the single point of control for both the hardware and software of the entire distributed system, that is, respectively, the network frame hardware and network frame software. All of the distributed systems (nodes) are physically connected to the CWS by means of one or more communications channels. The hardware functions of the nodes are monitored and managed directly from the CWS through this physical link. A distributed node can be powered on, powered off, reset, etc. from the central CWS. In addition, hardware aspects such as temperature, voltage, cooling fan speed, etc. are monitored for all nodes and maintained on the CWS.

A software program which runs continually on the CWS is responsible for this monitoring and management of the node hardware and provides an interface for administrator interaction with the nodes hardware. On the RS/6000 SP this program is the hardware monitor. Software functions can also be centrally managed from the CWS. For instance, the nodes can be installed, rebooted, and shutdown from the one central control node. Administrative functions such as starting up applications, retrieving node-specific information, and the management of system-wide high-availability software is also performed from the central control node.

These administrative functions are embodied in client requests which are sent directly to the network frame, who, in turn, sends the request to the intended diverse node. These client requests are translated into frame commands by the hardware monitor. These commands include power on/off, reset, etc. The responses, packaged by the hardware monitor, are state data returned by the network frame in the form of a frame packet. State data includes power status, temperature, voltages, fan speeds, etc.

One problem arising in a distributed computing environment is the collection of nodes that may be heterogeneous in nature, including differing hardware types and may run a variety of different operating systems, enablement and application software. The hardware monitor is responsible for the hardware monitoring and management of each of the different types of hardware nodes. The functions to be performed on each node are generally the same, but due to the diverse nature of the hardware, the protocols used to manage and monitor these different types of nodes are different. Implementing the different protocol interfaces within the hardware monitor program would complicate that program and its internal structure. Also, adding support for a new node hardware type would tend to be complicated. Since changes would affect the code path for all other node types, implementing new node support would risk affecting already stable function for existing node hardware types. Hence, a method and system is needed that can emulate network frame hardware and introduce hardware monitor support for a diverse hardware so that diverse node hardware appears to function as any other node hardware in a network frame.

There is therefore a need for a method and system for monitoring and managing a diverse hardware platform from a central control node in a distributed, parallel, heterogeneous computing system.

There is also a need for a method and system for expanding the single point of control in a distributed, parallel, heterogeneous computing system to diverse hardware in a more "risk-averse" fashion.

There is another need for a method and system that defines and maintains a single protocol which a hardware monitor can use to monitor and manage a diverse hardware platform.

There is also yet another need for a method and system for expanding the notion of a single point of control to heterogeneous hardware without affecting the reliability, availability, scaleability, and performance of established software supporting that hardware.

There is also a need for a method and system to insulate the hardware monitor from large and potentially risky changes and segregate the vast majority of new code into the present invention.

There is furthermore a need for a method and system whose application effectively emulates the function provided by network frame hardware.

There is also yet another need for a method and system that makes any diverse hardware appear to function as network frame hardware in a distributed, parallel, heterogeneous computing environment.

SUMMARY OF THE INVENTION

An exemplary embodiment of the present invention is a method for facilitating communication between a hardware monitor program for monitoring and management of node hardware and for providing an interface for administrative interaction with the node hardware in a network frame and diverse node hardware. The method includes receiving a request encoded in a hardware monitor protocol from the hardware monitor. An intermediary program decodes the request encoded in the hardware monitor protocol. The intermediary program encodes the request using a diverse hardware protocol of the intended diverse node hardware. The intermediary program sends the request encoded in diverse hardware protocol to the intended diverse node hardware.

Once a request is received, a response encoded in a diverse hardware protocol is sent by the intended diverse node hardware to the intermediary program. The intermediary program receives and decodes the response. The intermediary program encodes the response using a hardware monitor protocol. The intermediary program sends the response encoded in the hardware monitor protocol to the hardware monitor.

Another exemplary embodiment of the present invention is a system having a diverse hardware platform monitored and managed from a central control node in a computing environment. The computing environment utilizes a distributed, parallel, heterogeneous computing environment having a network frame and network frame hardware. The network frame hardware utilizes at least one central control node. The central control node executes both a hardware monitor program for monitoring and managing node hardware and for providing an interface for administrative interaction with the node hardware and an intermediary program for facilitating communication between the hardware monitor and the plurality of diverse node hardware. The intermediary program emulates network frame hardware by facilitating communication between the hardware monitor and diverse node hardware.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings in which.

DETAILED DESCRIPTION OF THE INVENTION

Figure 1:
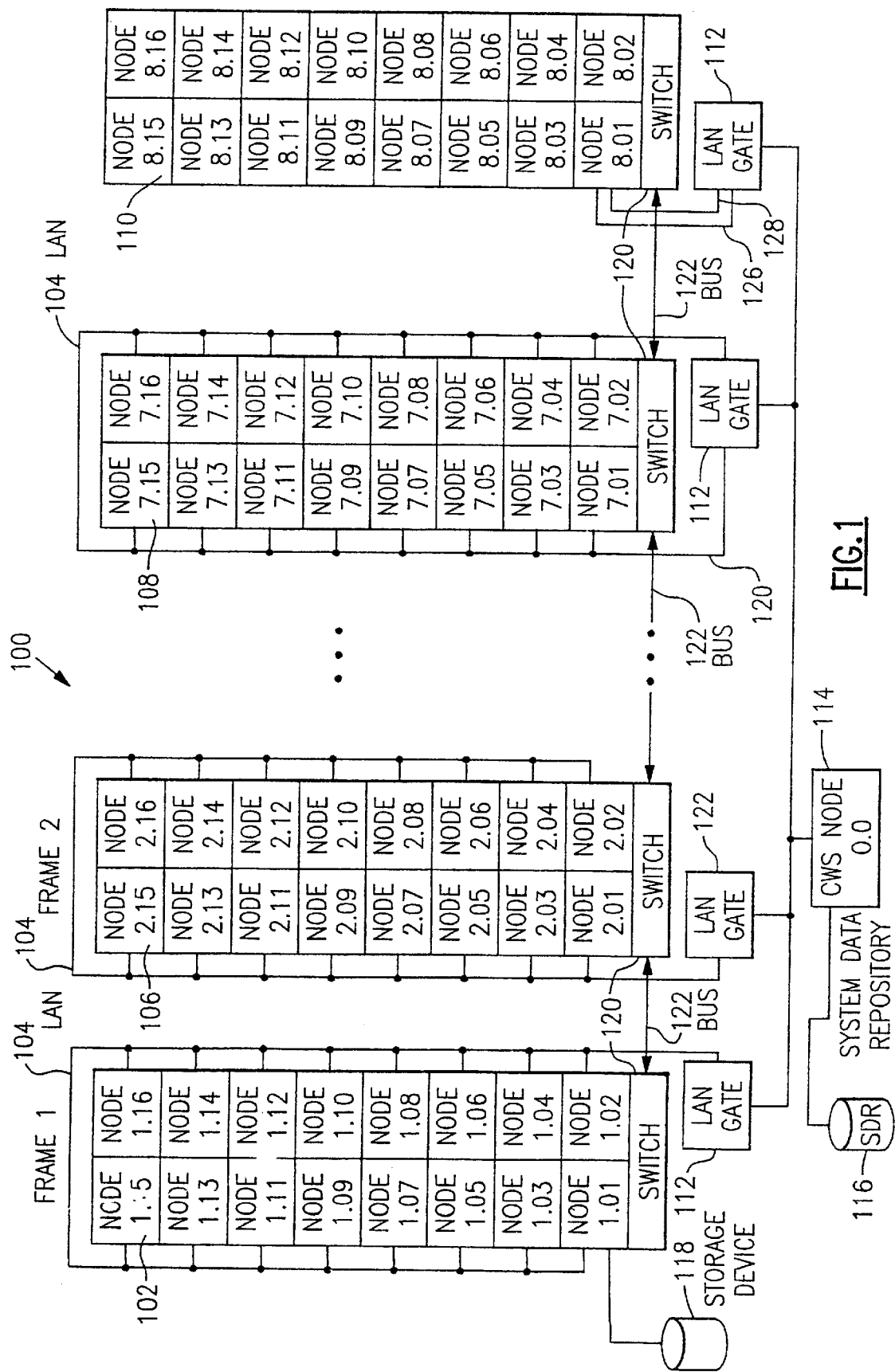
FIG. 1 is a schematic diagram of a distributed, parallel, heterogeneous computing system.

FIG. 1 is a schematic diagram of a distributed, parallel, heterogeneous computer system 100 incorporating the present invention. The distributed computer system 100 illustrated is an IBM RISC System/6000 Scalable POWER-parallel Systems (SP) distributed computer system available from International Business Machines Corporation of Armonk, N.Y. The embodiment disclosed in FIG. 1 is a distributed computer system 100 having a total of N+1 frames, with each frame 102 having up to sixteen nodes 104. Each node 104 is a computer itself, and may be a RISC System/6000 SP workstation 106, a RISC System/6000 S70 108 or an IBM Netfinity rack-mounted node 110, which are exemplary of the types of computers that can be implemented in a distributed, parallel, heterogeneous computer environment as is well understood by those skilled in the art.

Frames 102 are joined by a local area network (LAN) 112 through LAN gates 114. LAN 112 is also connected to a central control node or control workstation (CWS node) 116 which is not shown in FIG. 1. The CWS node 116 controls operation of the distributed computing system 100. As is well understood by those skilled in the art, the CWS node 116 has a direct access storage device (DASD) 118 on which is stored the system data repository files (SDR). Nodes 104 also have direct access storage devices which are not shown in FIG. 1. The SDR files include such information as a list of nodes that are in the system and their configuration.

CWS node 116 connects to each frame 102 via an RS-232 connection 120 which is well understood by those skilled in the art. FIG. 1 also illustrates an exemplary of the types of connections between a CWS node 116 and the diverse hardware in a distributed computing system 100. In the frame housing RISC System/6000 SP workstation 106, the connection 120 takes place between the CWS node 116 and an SP frame controller 122. In the frame which represents the standalone RISC System/6000 S70 computer system 108, the connection 120 takes place between a Service and Manufacturing Interface ("SAMI") controller 124 and CWS node 116. This interface is made possible by using the intermediary program 126 depicted as an S70 daemon 128 within CWS node 116 in FIG. 1. In the frame which represents the standalone Netfinity rack-mounted computer system 110, the connection 120 takes place between a SLIM controller 130, also understood by those skilled in the art as a protocol for a Wiseman card, and CWS node 116. This interface is made possible by using the intermediary program 126 depicted as a Netfinity daemon 132 within CWS node 116 in FIG. 1.

The nodes 104 are connected to an SP frame controller 122 which facilitates communication with the CWS node 116. Nodes 104, 106 and 108 are also connected to an IBM Scalable POWERparallel switch (SPS) 134 which is exemplary of the type of switch that can be implemented as is well understood by those skilled in the art. The SPS switches 134 of frames 102 are connected to neighboring SPS switches 134 of other frames 102 by switch data cables which are also well understood by those skilled in the art. The $I^2C$ bus 136 also runs parallel to each side of frames 102 having an SP frame controller 122 and connects to the odd-numbered nodes and even-numbered nodes, respectively, as shown in FIG. 1.

Figure 2:
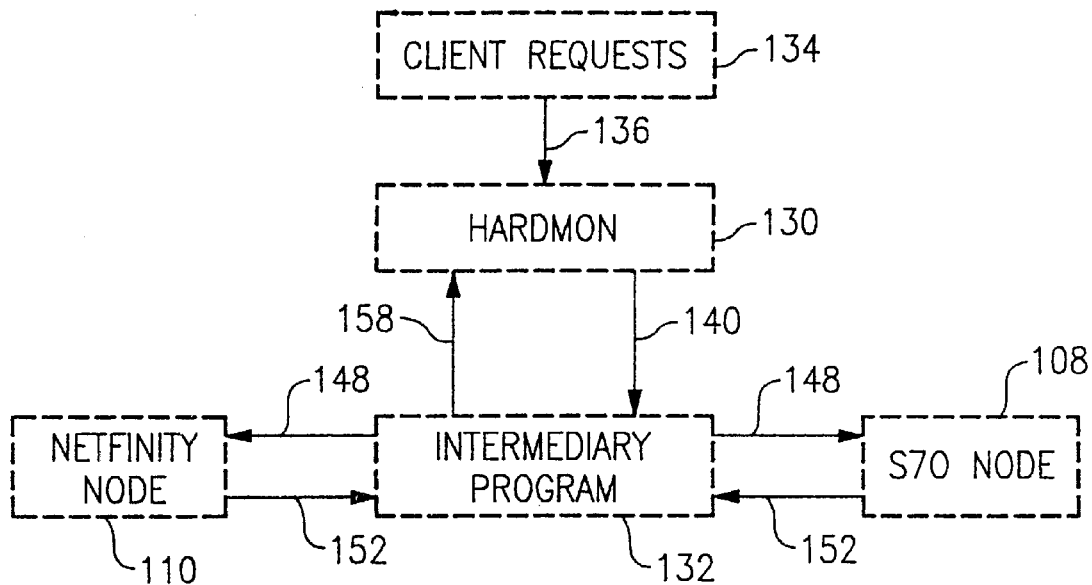
FIG. 2 is a flow chart of the present invention interfacing with the hardware monitor and system of nodes in a distributed, parallel, heterogeneous computing system.

FIG. 2 depicts how the CWS node 116 sends and receives messages and data to all nodes 104, including diverse nodes 108, 110 by executing the hardware monitor 138 ("hardmon") and intermediary program 126. As is well understood in the art, the RISC System/6000 SP workstation 106 contains nodes that are compatible with an SP computer system 100, such as in this example, and does not require intermediary program 126 to interface with hardware monitor 138.

Figure 3:
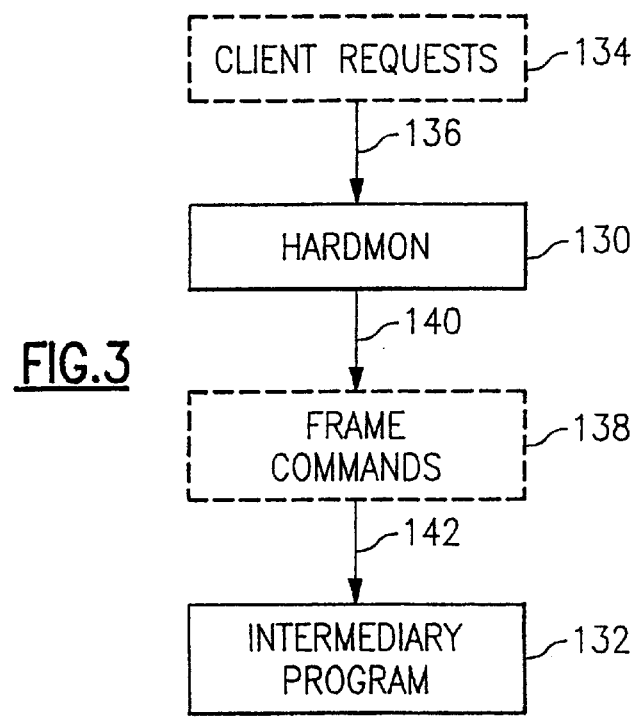
FIG. 3 is a flow chart of the present invention interfacing with the hardware monitor program.

FIG. 3 illustrates how hardware monitor 138 and intermediary program 126 interface. Hardware monitor 138 receives 'client requests' 140 in step 142. Hardware monitor 138 encodes these requests 140 into frame commands 144 using hardware monitor protocol in step 146. Hardware monitor protocol is a set of instructions readable by the network frame. Hardware monitor 138 sends frame commands 144 to intermediary program 126 in step 148.

Figure 4:
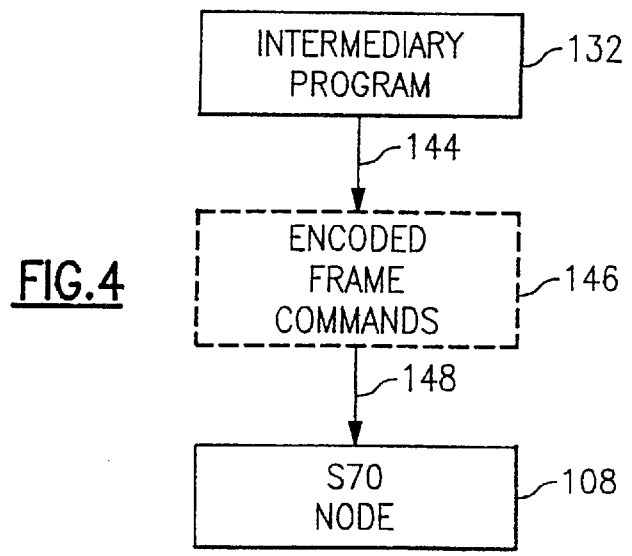
FIG. 4 is a flow chart of the present invention interfacing with an intended diverse node hardware.

As depicted in FIG. 4 once the frame commands 144 are received, intermediary program 126 decodes the frame commands 144. Intermediary program 126 then interprets and encodes the frame commands 144 into the diverse hardware protocol of the intended diverse node hardware 108 or 110 in step 150. Lastly, intermediary program 126 sends the encoded frame commands 152 to intended diverse node hardware 108 or 110 to complete step 154. Both the S70 and Netfinity rack nodes 108, 110 are diverse nodes that must receive encoded frame commands 152 from intermediary program 126 to communicate with hardware monitor 138.

Figure 5:
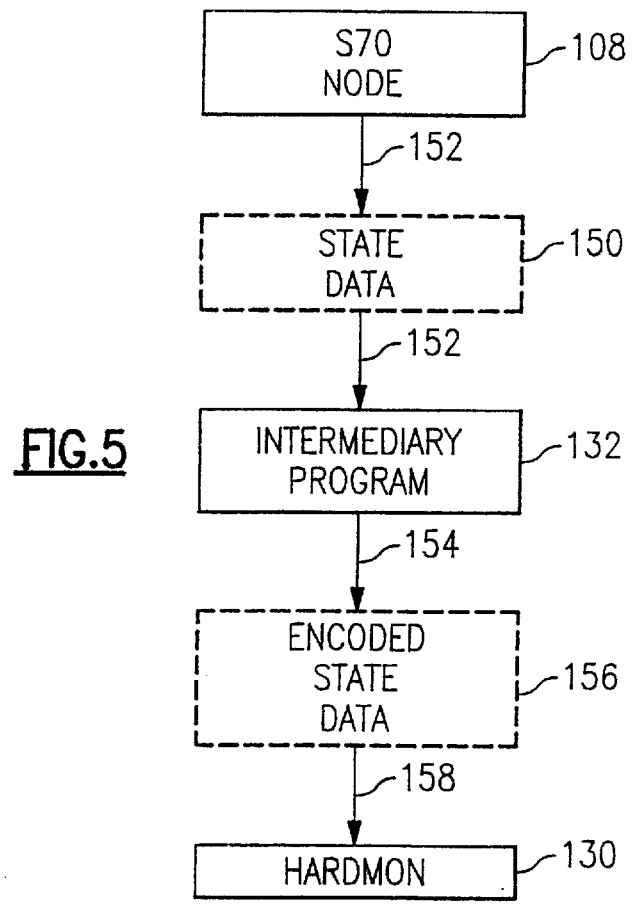
FIG. 5 is a flow chart of the present invention depicting an intended diverse node hardware interfacing with the hardware monitor.

FIG. 5 further illustrates how hardware monitor 138 interfaces with a diverse node hardware such as node 108 or 110 by using intermediary program 126. Once encoded frame commands 152 are received, intended diverse node hardware 108 interprets frame commands 152. The intended diverse node hardware 108 then sends state data 156 or 'responses' in the form of a frame packet to intermediary program 126 in step 158. State data 156 includes status updates such as power status, temperature, voltages, fan speeds, etc. from the intended diverse node hardware 108.

Intermediary program 126 decodes state data 156. Intermediary program 126 then interprets and encodes state data 156 using hardware monitor protocol in step 160. Intermediary program 126 sends encoded state data 162 to hardware monitor 138 to complete step 164.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention is susceptible to various modifications and alternate forms, specific embodiments have been shown and described in a manner sufficient to enable persons having ordinary skill to utilize the invention in practice without undue experimentation. It will be understood, of course, that the invention is not limited to the particular forms disclosed, but rather is to cover all modifications, equivalents and alternatives falling within the spirit and scope of the invention as defined by the following claims.

What is claimed is:

1. A method of facilitating communications between a hardware monitor program for monitoring and management of a plurality of node hardware and for providing an interface for administrator interaction with the node hardware in a network frame and a plurality of diverse node hardware comprising:
   receiving a request encoded in a hardware monitor protocol from the hardware monitor program;
   decoding the request encoded in the hardware monitor protocol;
   encoding the request using a diverse node hardware protocol;
   sending a request encoded in the diverse node hardware protocol to an intended diverse node hardware;
   receiving a response encoded in the diverse node hardware protocol from the intended diverse node hardware;
   decoding the response encoded in the diverse node hardware protocol;
   encoding the response using the hardware monitor program protocol; and
   sending a response encoded in the hardware monitor program protocol to the hardware monitor program.

2. A method of claim 1, wherein the hardware monitor program protocol is comprised of a set of instructions readable by the network frame.

3. A method of claim 2, wherein decoding the request from the hardware monitor program comprises interpreting the set of instructions readable by the network frame.

4. A method of claim 3, wherein encoding the request from the hardware monitor program comprises translating the set of instructions readable by the network frame into the diverse node hardware protocol.

5. A method of claim 4, wherein decoding the response from the diverse node hardware comprises interpreting the diverse node hardware protocol.

6. A method of claim 5, wherein encoding the response from the diverse node hardware comprises translating the diverse node hardware protocol into the set of instructions readable by the network frame.

7. A method of claim 1, wherein the hardware monitor protocol is comprised of a set of instructions readable by the network frame.

8. A method of claim 1, wherein decoding the request from the hardware monitor program comprises interpreting the hardware monitor protocol, the hardware monitor protocol comprised of a set of instructions readable by the network frame.

9. A method of claim 1, wherein encoding the request from the hardware monitor program comprises translating the hardware monitor protocol using the diverse node hardware protocol, the hardware monitor protocol comprised of a set of instructions readable by the network frame.

10. A method of claim 1, wherein decoding the response from the diverse node hardware comprises interpreting the diverse node hardware protocol.

11. A method of claim 1, wherein encoding the response from the diverse node hardware comprises translating the diverse node hardware protocol into the hardware monitor protocol, the hardware monitor protocol comprised of a set of instructions readable by the network frame.

12. A system having a diverse hardware platform monitored and managed from a central control node in a computing environment, the system comprising:
   at least one distributed, parallel, heterogeneous computing environment having a network frame and a network frame hardware, the network frame hardware having at least one central control node;
   a hardware monitor program for the network frame being executed by the at least one central control node for monitoring and managing a plurality of node hardware and for providing an interface for administrative interaction with the plurality of node hardware, the plurality of node hardware comprising a plurality of node hardware and a plurality of diverse node hardware; and
   an intermediary hardware monitor program being executed by the at least one central control node for facilitating communications between the hardware monitor program and the plurality of diverse node hardware.

13. A system of claim 12, further comprising instructions for causing the machine to configure the hardware monitor program for the network frame to communicate with the plurality of diverse node hardware by executing the intermediary program.

14. A system of claim 12, wherein the intermediary program being executed by the at least one central control node emulates a plurality of functions of the network frame hardware.

15. A system of claim 14, wherein the hardware monitor program communicates with the diverse node hardware in the network frame by interacting with the intermediary program emulating the plurality of functions of the network frame hardware.

16. A system of claim 12, wherein the intermediary program being executed by the at least one central control node emulates a plurality of functions of the network frame hardware whereby the hardware monitor program recognizes and communicates with the diverse node hardware in the network frame by interacting with the intermediary program.

17. An article of manufacture comprising:
a computer usable medium having computer readable program code means embodied therein for monitoring and managing a diverse hardware platform from a central control node in a distributed, parallel, heterogeneous computing environment, the computing environment having a network frame and a network frame hardware, the network frame hardware having at least one central control node, the at least one central control node having a hardware monitor program for monitoring and management of a node hardware and for providing an interface for administrator interaction with the node hardware in the network frame and for providing an administrator interaction with the node hardware, the node hardware comprising a plurality of diverse node hardware, the apparatus comprising:
computer readable program code means for causing the hardware monitor program to send a plurality of requests encoded in a hardware monitor protocol to the plurality of diverse node hardware;
computer readable program code means for causing the plurality of diverse node hardware to receive the plurality of requests from the hardware monitor program;
computer readable program code means for causing the plurality of diverse node hardware to send a plurality of responses encoded in a diverse node hardware protocol to the hardware monitor program; and
computer readable program code means for causing the hardware monitor program to receive the plurality of responses from the plurality of diverse node hardware.

18. A storage medium encoded with machine-readable program instructions for facilitating communications between a hardware monitor program for monitoring and management of a plurality of node hardware and for providing an interface for administrator interaction with the node hardware in a network frame and a plurality of diverse node hardware by performing a process comprising:
receiving a request encoded in a hardware monitor protocol from the hardware monitor program;
decoding the request encoded in the hardware monitor protocol;
encoding the request using a diverse node hardware protocol;
sending a request encoded in the diverse node hardware protocol to an intended diverse node hardware;
receiving a response encoded in the diverse node hardware protocol from the intended diverse node hardware;
decoding the response encoded in the diverse node hardware protocol;
encoding the response using the hardware monitor program protocol; and
sending a response encoded in the hardware monitor program protocol to the hardware monitor program.

19. A storage medium of claim 18, wherein the hardware monitor program protocol is comprised of a set of instructions readable by the network frame.

20. A storage medium of claim 19, wherein decoding the request from the hardware monitor program comprises interpreting the set of instructions readable by the network frame.

21. A storage medium of claim 20, wherein encoding the request from the hardware monitor program comprises translating the set of instructions readable by the network frame into the diverse node hardware protocol.

22. A storage medium of claim 21, wherein decoding the response from the diverse node hardware comprises interpreting the diverse node hardware protocol.

23. A storage medium of claim 22, wherein encoding the response from the diverse node hardware comprises translating the diverse node hardware protocol into the set of instructions readable by the network frame.

24. A storage medium of claim 18, wherein the hardware monitor protocol is comprised of a set of instructions readable by the network frame.

25. A storage medium of claim 18, wherein decoding the request from the hardware monitor program comprises interpreting the hardware monitor protocol, the hardware monitor protocol comprised of a set of instructions readable by the network frame.

26. A storage medium of claim 18, wherein encoding the request from the hardware monitor program comprises translating the hardware monitor protocol using the diverse node hardware protocol, the hardware monitor protocol comprised of a set of instructions readable by the network frame.

27. A storage medium of claim 18, wherein decoding the response from the diverse node hardware comprises interpreting the diverse node hardware protocol.

28. A storage medium of claim 18, wherein encoding the response from the diverse node hardware comprises translating the diverse node hardware protocol into the hardware monitor protocol, wherein the hardware monitor protocol is comprised of a set of instructions readable by the network frame.

29. An apparatus with machine-readable program instructions for facilitating communications between a hardware monitor program for monitoring and management of a node hardware and for providing an interface for administrator interaction with the node hardware in a network frame and a diverse node hardware comprising:
means for receiving a request encoded in a hardware monitor protocol from the hardware monitor program;
means for decoding the request encoded in the hardware monitor protocol;
means for encoding the request into a diverse node hardware protocol;
means for sending the request encoded in the diverse node hardware protocol to the diverse node hardware;
means for receiving a response encoded in the diverse node hardware protocol from the diverse node hardware;
means for decoding the response encoded in the diverse node hardware protocol;
means for encoding the response into the hardware monitor protocol; and
means for sending the response encoded in the hardware monitor protocol to the hardware monitor program.

* * * * *